US009967121B2

(12) United States Patent
Lee et al.

(10) Patent No.: US 9,967,121 B2
(45) Date of Patent: May 8, 2018

(54) APPARATUS AND METHOD FOR ESTIMATING CARRIER FREQUENCY OFFSET

(71) Applicant: MStar Semiconductor, Inc., Hsinchu Hsien (TW)

(72) Inventors: Kuan-Chou Lee, Zhubei (TW); Tai-Lai Tung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days. days.

(21) Appl. No.: 15/451,568

(22) Filed: Mar. 7, 2017

(65) Prior Publication Data

US 2018/0076991 A1 Mar. 15, 2018

(30) Foreign Application Priority Data

Sep. 13, 2016 (TW) .............................. 105129795 A

(51) Int. Cl.
*H04L 27/233* (2006.01)
*H04L 27/34* (2006.01)
*H04L 27/00* (2006.01)

(52) U.S. Cl.
CPC .......... *H04L 27/2334* (2013.01); *H04L 27/34* (2013.01); *H04L 27/0014* (2013.01); *H04L 2027/003* (2013.01); *H04L 2027/0051* (2013.01)

(58) Field of Classification Search
CPC ....... H04L 2027/003; H04L 2027/0051; H04L 27/0014; H04L 27/2334; H04L 27/34
See application file for complete search history.

(56) References Cited

U.S. PATENT DOCUMENTS

| 6,240,282 B1* | 5/2001 | Kleider ............... H04L 27/0012 375/285 |
| 8,611,472 B2* | 12/2013 | Mishra ............... H04L 27/0014 375/260 |
| 2014/0241466 A1* | 8/2014 | Cajegas, III ........ H04L 27/2271 375/326 |

* cited by examiner

*Primary Examiner* — Janice Tieu
(74) *Attorney, Agent, or Firm* — Edell, Shapiro & Finnan, LLC

(57) ABSTRACT

An apparatus for estimating carrier frequency offset includes a notch frequency setting circuit, N notch filters, an $M^{th}$ power circuit, a spectrum generating circuit, a peak frequency determining circuit, a comparing circuit, and a frequency offset determining circuit. The notch frequency setting circuit sets different notch-frequencies for the notch filters, which generate N filtered signals by filtering an input signal. The $M^{th}$ power circuit performs an $M^{th}$ power calculation on the N filtered signals to generate N $M^{th}$ power filtered signals. The spectrum generating circuit generates N $M^{th}$ order spectra for the N $M^{th}$ power filtered signals. The peak frequency determining circuit determines respective peak frequencies of the N $M^{th}$ order spectra. The comparing circuit identifies an optimal peak frequency from the N peak frequencies. The frequency offset determining circuit determines an estimated carrier frequency offset according to the optimal peak frequency.

10 Claims, 8 Drawing Sheets

APPARATUS AND METHOD FOR ESTIMATING CARRIER FREQUENCY OFFSET

This application claims the benefit of Taiwan application Serial No. 105129795, filed Sep. 13, 2016, the subject matter of which is incorporated herein by reference.

BACKGROUND OF THE INVENTION

Field of the Invention

The invention relates in general to an electronic signal receiving apparatus, and more particularly to a technology for estimating carrier frequency offset (CFO) in an electronic signal receiving apparatus.

Description of the Related Art

Various types of communication systems get more and more popular as related technologies in the electronics field continue to advance. Both a transmitter and a receiver of a communication system are provided with at least one oscillation signal source (e.g., a quartz oscillator) that provides a clock signal as a basis for circuit operations. Clock frequencies of the transmitter and the receiver need to achieve certain consistency in operation so that the receiver can correctly parse signals sent from the transmitter. The frequency of a clock signal that the receiver adopts for down-converting an input signal might differ from the frequency of a clock signal that the transmitter adopts for up-converting a baseband signal, and such issue is commonly referred to as carrier frequency offset (CFO) at the receiver. The CFO may lead to inter-carrier interference, causing negative effects such as degraded system performance of the receiver, and the receiver may even become incapable of parsing its input signal in some severe cases. Exact matching between the oscillators of a transmitter and a receiver is extremely difficult, and so the receiver is usually designed with a mechanism for compensating CFO. In general, frequency offset compensation can be effectively conducted only if a receiver estimates the value of the CFO correctly.

FIG. 1(A) shows a block diagram of CFO estimating apparatus applicable to a quadrature phase shift keying (QPSK) signal. As shown in FIG. 1(A), a CFO estimating apparatus 100 includes a $4^{th}$ power circuit 11, a spectrum generating circuit 12, a peak frequency determining circuit 13, and a frequency offset determining circuit 14. An input signal y(t) of the $4^{th}$ power circuit 11 may be a QPSK baseband signal, which may be a baseband signal generated from a radio-frequency (RF) signal having passed circuits such a low-noise amplifying circuit, a down-converting circuit, an analog-to-digital converter (ADC) and a low-pass filter (LPF) in a receiver coordinating with the CFO estimating apparatus 100. The $4^{th}$ power circuit 11 performs a $4^{th}$ power calculation on the input signal y(t) to generate a $4^{th}$ power calculation result $y^4(t)$. The spectrum generating circuit 12 generates a $4^{th}$ order spectrum Z(f) by performing fast Fourier transform (FFT) according to the $4^{th}$ power calculation result $y^4(t)$ outputted from the $4^{th}$ power circuit 11. The peak frequency determining circuit 13 determines a peak frequency $\Omega$ from the $4^{th}$ order spectrum Z(f), wherein the peak frequency $\Omega$ is a frequency corresponding to a maximum energy peak value in the $4^{th}$ order spectrum Z(f). Taking the $4^{th}$ order spectrum Z(f) in FIG. 1(B) for example, the peak frequency determining circuit 13 selects the energy P0 as the maximum energy peak $P_{MAX}$, and regards its corresponding frequency as the peak frequency $\Omega$. The frequency offset determining circuit 14 divides the peak frequency $\Omega$ that the peak frequency determining circuit 13 identifies by 4 to generate an estimated CFO $\Delta f_E$.

However, if the signal y(t) is propagated through a multipath, the input signal y(t) is often mixed with an echo signal. The echo signal may affect the energy distribution of the foregoing $4^{th}$ order spectrum Z(f) to an extent that the peak frequency $\Omega$ calculated by the peak frequency determining circuit 13 is not four times the CFO (a four-fold CFO), in a way that the frequency offset determining circuit 14 generates an incorrect estimated CFO $\Delta f_E$.

FIG. 1(C) shows an exemplary $4^{th}$ order spectrum Z'(f). In this example, the frequency where the energy P0 is located truly corresponds to the four-fold CFO. However, the peak frequency determining circuit 13 selects the energy P1 as the maximum energy peak $P'_{MAX}$ and selects its corresponding frequency as the peak frequency $\Omega'$, such that the frequency offset determining circuit 14 calculates an incorrect estimated CFO $\Delta f_E$.

SUMMARY OF THE INVENTION

The invention is directed to an apparatus and method for estimating carrier frequency offset.

According to an embodiment of the present invention, an apparatus for estimating carrier frequency offset is provided. The apparatus includes N notch filters, an $M^{th}$ power circuit, a spectrum generating circuit, a peak frequency determining circuit, a comparing circuit and a frequency offset determining circuit. The N notch filters have respective different notch frequencies, and filter an input signal to generate N filtered signals, where N is an integer greater than 2. The $M^{th}$ power circuit performs an $M^{th}$ power calculation on the N filtered signals to generate N $M^{th}$ power filtered signals, where M is an integer greater than 1 and is associated with a modulation scheme of the input signal. The spectrum generating circuit generates respective $M^{th}$ order spectra for the N $M^{th}$ power filtered signal. The peak frequency determining circuit determines N peak frequencies according to the N $M^{th}$ order spectra. The comparing circuit identifies an optimal peak frequency from the N peak frequencies, wherein the optimal peak frequency is a peak frequency that is different from the other peak frequencies among the N peak frequencies. The frequency offset determining circuit determines an estimated carrier frequency offset according to the optimal peak frequency.

According to another embodiment of the present invention, a method for estimating carrier frequency offset is provided. According to an input signal, N different notch frequencies are set, where N is an integer greater than 2. The input signal is filtered by the N different notch frequencies to generated N filtered signals. An $M^{th}$ power calculation is performed on the N filtered signals to generate N $M^{th}$ power filtered signals, where M is an integer greater than 1 and is associated with a modulation scheme performed on the input signal. Respective $M^{th}$ order spectra are generated for the N $M^{th}$ power filtered signals. Respective peak frequencies of the N $M^{th}$ order spectra are determined. An optimal peak frequency is identified from the N peak values, wherein the optimal peak frequency is a peak frequency that is different from the other peak frequencies among the N peak frequencies. An estimated carrier frequency offset is determined according to the optimal peak frequency.

The above and other aspects of the invention will become better understood with regard to the following detailed description of the non-limiting embodiments. The following description is made with reference to the accompanying drawings.

Figure 1A:
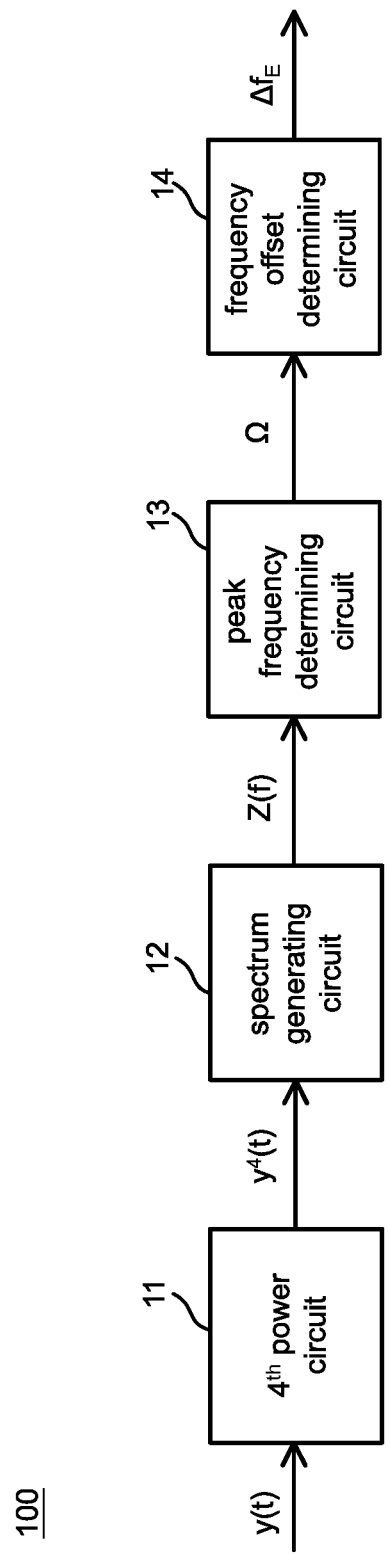
FIG. 1(A) is a block diagram of a carrier frequency offset estimating apparatus suitable for quadrature phase shift keying (QPSK) signals.
Figure 1B:
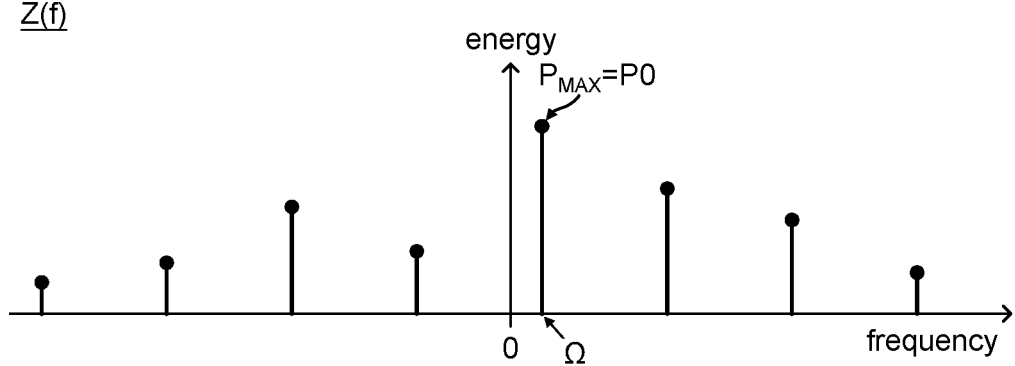
FIG. 1(B) is an example of a $4^{th}$ order spectrum of an input signal.
Figure 1C:
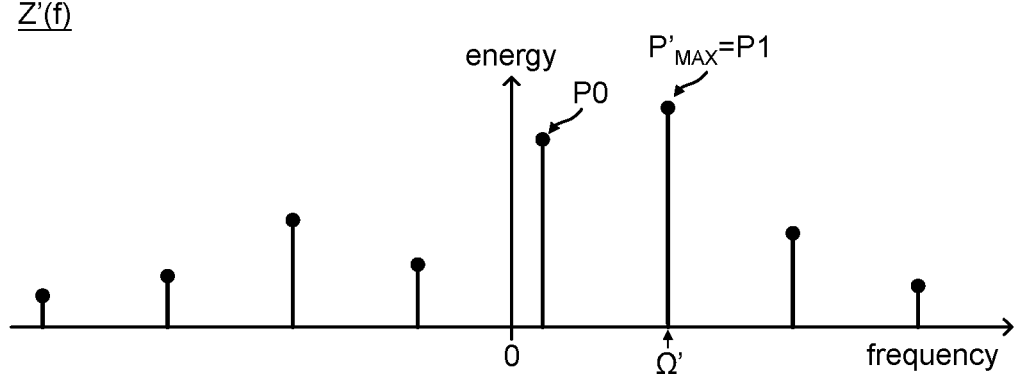
FIG. 1(C) is an example of a $4^{th}$ order spectrum of an input signal containing an echo signal.

It should be noted that, the drawings of the present invention include functional block diagrams of multiple functional modules related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

Figure 2A:
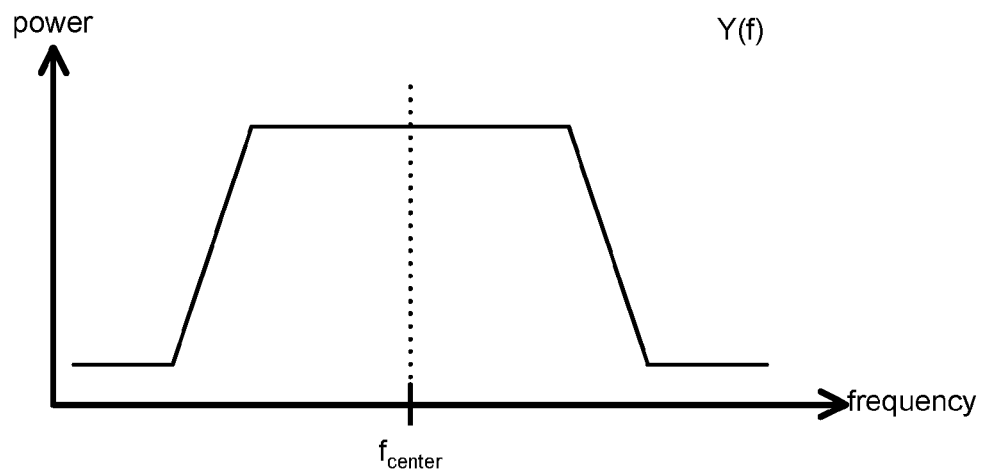
FIG. 2(A) is an example of a spectrum of an input signal.
Figure 2B:
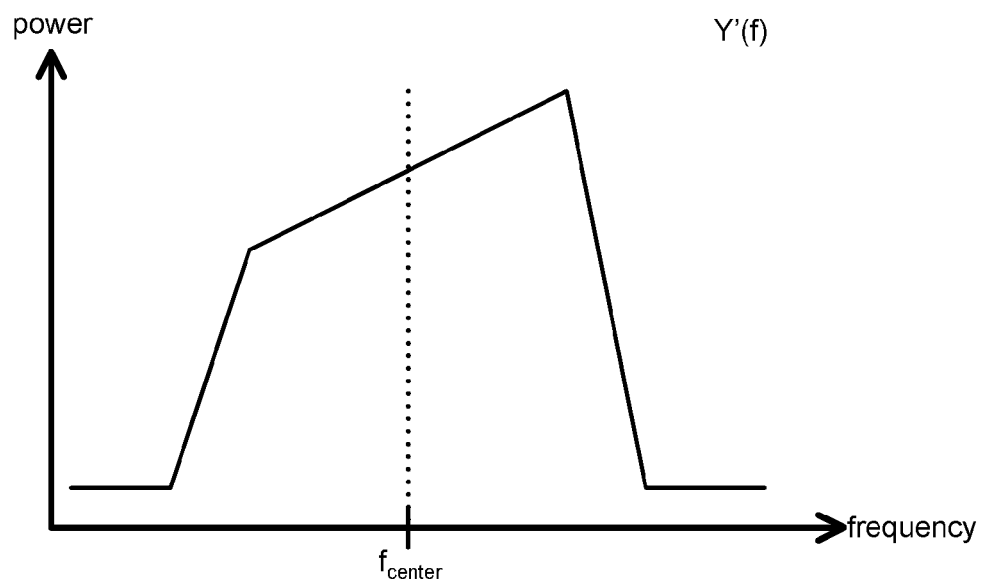
FIG. 2(B) is an example of a spectrum of an input signal containing an echo signal.

Based on the Applicant's observation, the shape of a spectrum Y(f) of an input signal y(t) without any echo signal is usually symmetrical to a center frequency $f_{center}$, as shown in FIG. 2(A), for example. In contrast, a spectrum Y'(f) of an input signal y(t) containing an echo signal is usually not symmetrical to the center frequency $f_{center}$, as shown in FIG. 2(B), for example. Thus, to eliminate the effect of an echo signal, the present invention filters an input signal y(t) using notch filters, hence preventing an incorrect estimated CFO.

The apparatus and method for estimating CFO of the present invention may be applied to a receiver of various communication systems, for example but not limited to, a Digital Video Broadcasting—Satellite (DVB-S) receiver or a Digital Video Broadcasting—Cable (DVB-C) receiver.

Figure 3:
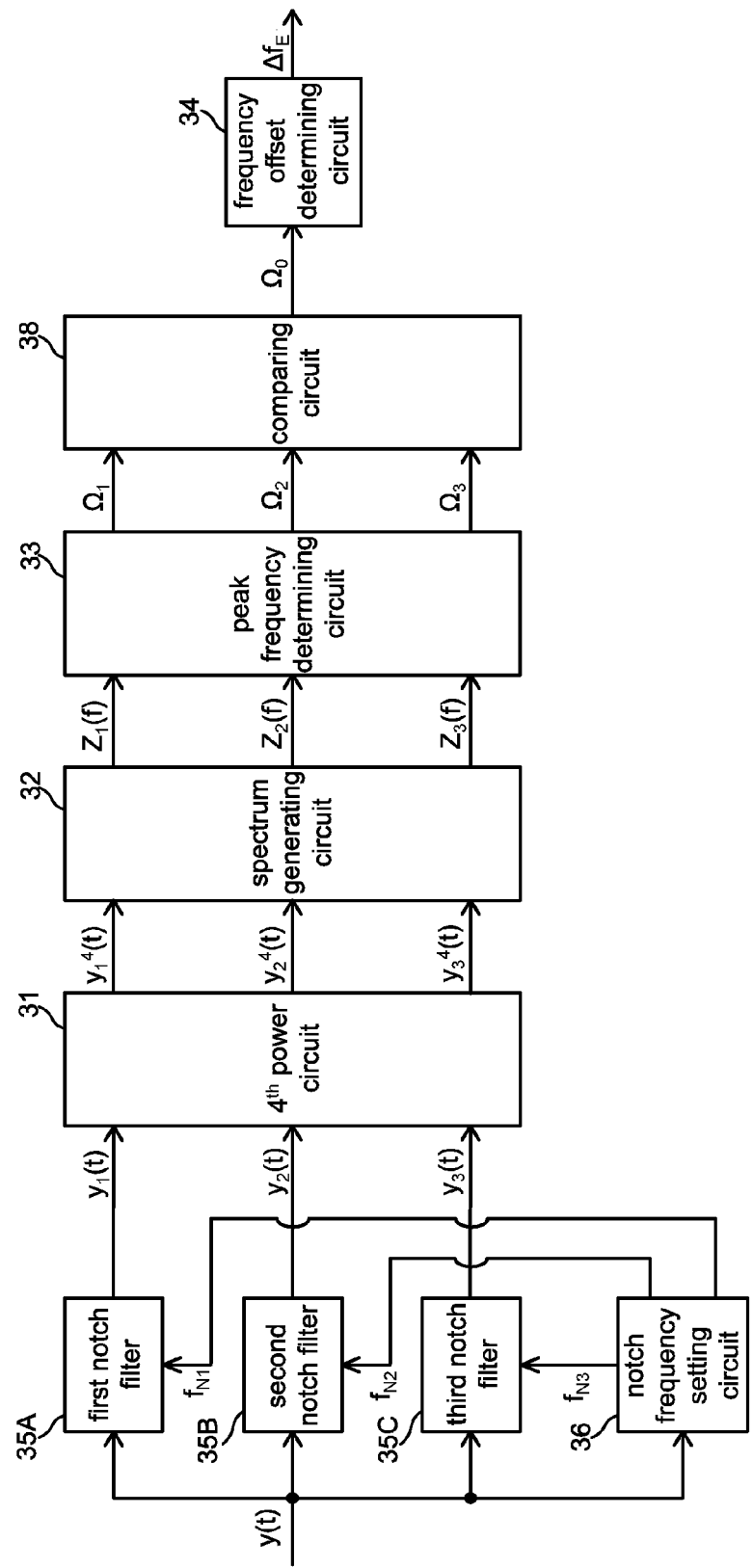
FIG. 3 is a an apparatus for estimating carrier frequency offset according to an embodiment of the present invention.

FIG. 3 shows a block diagram of an apparatus for estimating CFO according to an embodiment of the present invention. Referring to FIG. 3, a CFO estimating apparatus 300 includes a $4^{th}$ power circuit 31, a spectrum generating circuit 32, a peak frequency determining circuit 33, a frequency offset determining circuit 34, three notch filters 35A to 35C connected in parallel, a notch frequency setting circuit 36, and a comparing circuit 38.

An input signal y(t) of the CFO estimating circuit 300 is a quadrature phase shift keying (QPSK) baseband signal. In practice, the baseband signal may be, for example but not limited to, a radio-frequency (RF) signal generated through a low-noise amplifier (LNA), a down-converting circuit, an analog-to-digital converter (ADC), and a low-pass filter (LPF) in a receiver.

Figure 4:
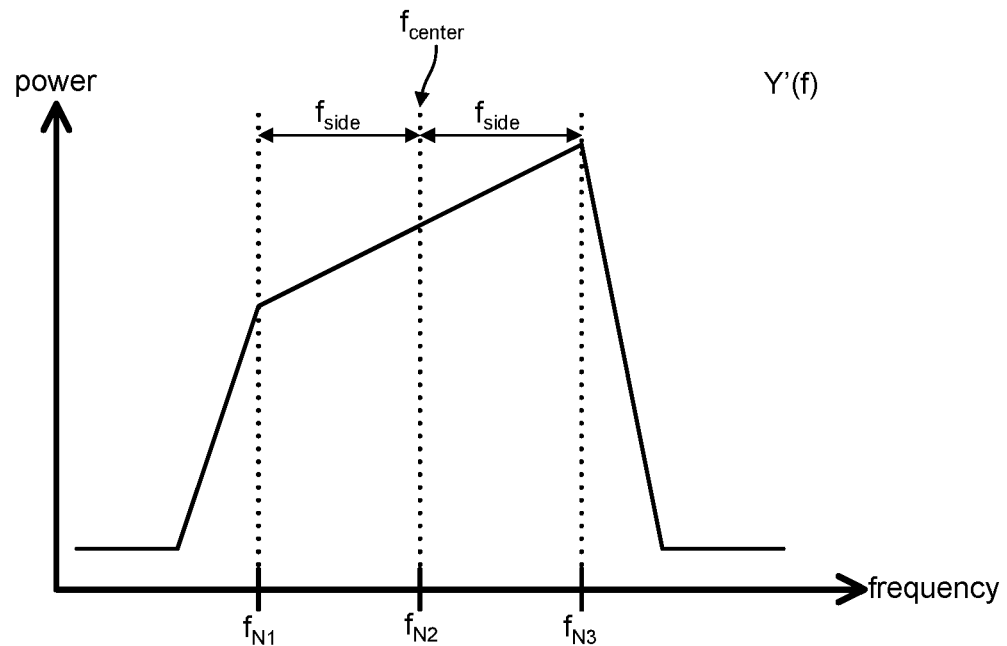
FIG. 4 shows exemplary positions of three notch frequencies.

The notch frequency setting circuit 36 sets different notch frequencies $f_{N1}$, $f_{N2}$ and $f_{N3}$ for the notch filters 35A to 35C according to the input signal y(t). The notch filters 35A to 35C perform a filtering process on the input signal y(t) to generate filtered signals $y_1(t)$, $y_2(t)$ and $y_3(t)$. Based on the spectrum Y'(f) shown in FIG. 2(B), FIG. 4 shows examples of the notch frequencies $f_{N1}$, $f_{N2}$ and $f_{N3}$. As shown in FIG. 4, the notch frequency $f_{N2}$ is set to equal to the center frequency $f_{center}$ of the input signal y(t); the notch frequency $f_{N1}$ is set to the center frequency $f_{center}$ subtracted by a side frequency $f_{side}$, i.e., ($f_{center}-f_{side}$); the notch frequency $f_{N3}$ is set to the center frequency $f_{center}$ added by a side frequency $f_{side}$, i.e., ($f_{center}+f_{side}$).

Figure 5:
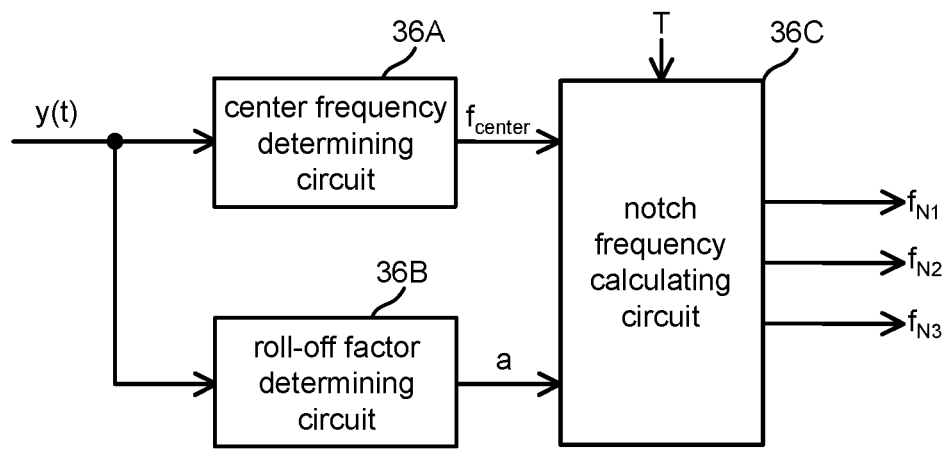
FIG. 5 is a block diagram of a notch frequency setting circuit according to an embodiment of the present invention.

FIG. 5 shows a block diagram of the notch frequency setting circuit 36 according to an embodiment of the present invention. In this embodiment, the notch frequency setting circuit 36 includes a center frequency determining circuit 36A, a roll-off factor determining circuit 36B, and a notch frequency calculating circuit 36C. The center frequency determining circuit 36A determines the center frequency $f_{center}$ of the input signal y(t). The roll-off factor determining circuit 36B determines a roll-off factor a of the input signal y(t). The notch frequency calculating circuit 36C then calculates the notch frequencies $f_{N1}$, $f_{N2}$ and $f_{N3}$ according to the center frequency $f_{center}$ of the input signal y(t), the roll-off factor a and a symbol duration T, and outputs the notch frequencies $f_{N1}$, $f_{N2}$ and $f_{N3}$ to the notch filters 35A to 35C, respectively. The symbol duration T may be learned from parsing an input signal y(t) by other circuits in the receiver or may be a constant value agreed by both of the transmitter and the receiver. More specifically, the notch frequency calculating circuit 36C may determine the notch frequency $f_{N2}$ according to the center frequency $f_{center}$ of the input signal y(t), i.e., causing $f_{N2}=f_{center}$. The notch frequency calculating circuit 36C further calculates the notch frequencies $f_{N1}$ and $f_{N3}$ according to the center frequency $f_{center}$ and the side frequency $f_{side}$, wherein $f_{N1}=(f_{center}-f_{side})$ and $f_{N3}=(f_{center}+f_{side})$. It should be noted that, the determination for the center frequency $f_{center}$ of the input signal y(t), the roll-off factor a, and the symbol duration T is generally known to one person skilled in the art, and shall be omitted herein. Further, the present invention is not limited to determining the side frequency $f_{side}$ based on the roll-off factor a and the symbol duration T.

The $4^{th}$ power circuit 31 performs a $4^{th}$ power calculation on the filtered signals $y_1(t)$, $y_2(t)$ and $y_3(t)$ to generate respective $4^{th}$ power filtered signals $y_1^4(t)$, $y_2^4(t)$ and $y_3^4(t)$. The spectrum generating circuit 32 then generates corresponding $4^{th}$ order spectra $Z_1(f)$, $Z_2(f)$ and $Z_3(f)$ according to the $4^{th}$ power filtered signals $y_1^4(t)$, $y_2^4(t)$ and $y_3^4(t)$, respectively. In practice, the spectrum generating circuit 32 may be, for example but not limited to, a fast Fourier transform (FFT) circuit. The peak frequency determining circuit 33 determines peak frequencies $\Omega_1$, $\Omega_2$ and $\Omega_3$ from the $4^{th}$ order spectra $Z_1(f)$, $Z_2(f)$ and $Z_3(f)$, respectively. It should be noted that, implementation details of the $4^{th}$ power circuit 31, the spectrum generating circuit 32, the peak frequency determining circuit 33 are generally known to one person skilled in the art, and shall be omitted herein.

Figure 6:
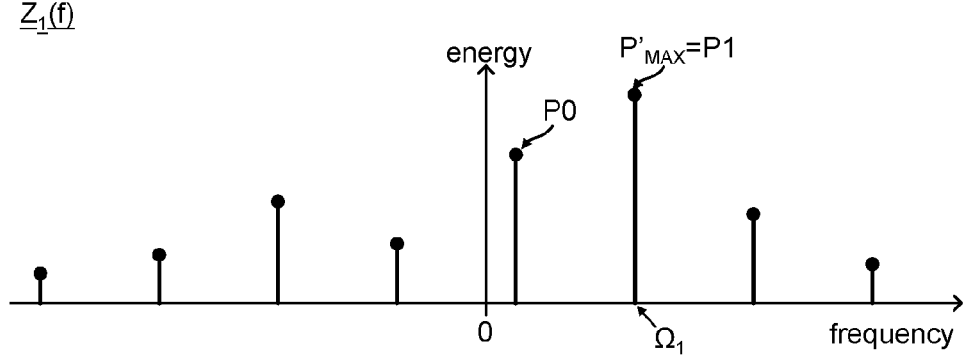
FIG. 6(A) to FIG. 6(C) are examples of the $4^{th}$ order spectrum corresponding to the input signal in FIG. 2(B) of the present invention.
Figure 6:
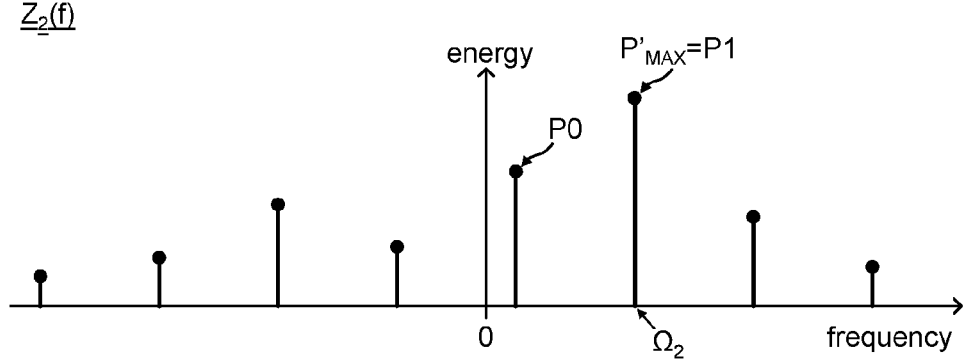
Figure 6:
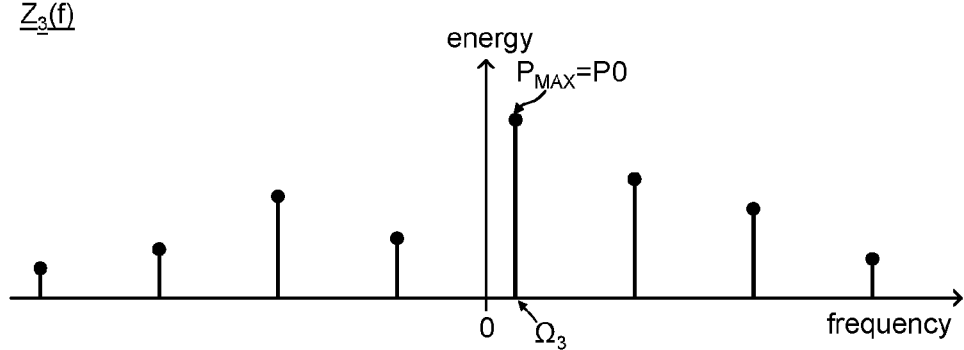

Taking the input signal shown in FIG. 2(B) for instance, FIG. 6(A) to FIG. 6(C) show examples of the $4^{th}$ order spectra $Z_1(f)$, $Z_2(f)$ and $Z_3(f)$ corresponding to the input signal shown in FIG. 2(B). For the spectrum $Y'(f)$ shown in FIG. 2(B), because energies corresponding to the frequencies higher than the center frequency $f_{center}$ are larger, only the notch filter 35C having a higher notch frequency, but not the notch filter 35A and the notch filter 35B having lower notch frequencies, can effectively remove the effect that an echo signal has on the input signal y(t). Thus, the peak frequencies $\Omega_1$ and $\Omega_2$ of the $4^{th}$ order spectra $Z_1(f)$ and $Z_2(f)$ do not truly correspond to four times of the CFO (four-fold CFO), but only the peak frequency $\Omega_3$ of the $4^{th}$ order spectrum $Z_3(f)$ truly corresponds to a four-fold CFO. It is accordingly deduced that, among multiple peak frequencies, only the peak frequency that is different from the other peak frequencies truly corresponds to a four-fold CFO.

The comparing circuit identifies an optimal peak frequency $\Omega_0$ from the peak frequencies $\Omega_1$, $\Omega_2$ and $\Omega_3$, and outputs the optimal peak frequency $\Omega_0$ to the frequency offset determining circuit 34. The optimal peak frequency $\Omega_0$ is a peak frequency that is different from the other peak frequencies among multiple peak frequencies. Next, the frequency offset determining circuit 34 determines an estimated CFO $\Delta f_E$ according to the optimal peak frequency $\Omega_0$. In one embodiment, the frequency offset determining circuit 34 may divide the optimal peak frequency $\Omega_0$ by four to generate the estimated CFO $\Delta f_E$.

Figure 7:
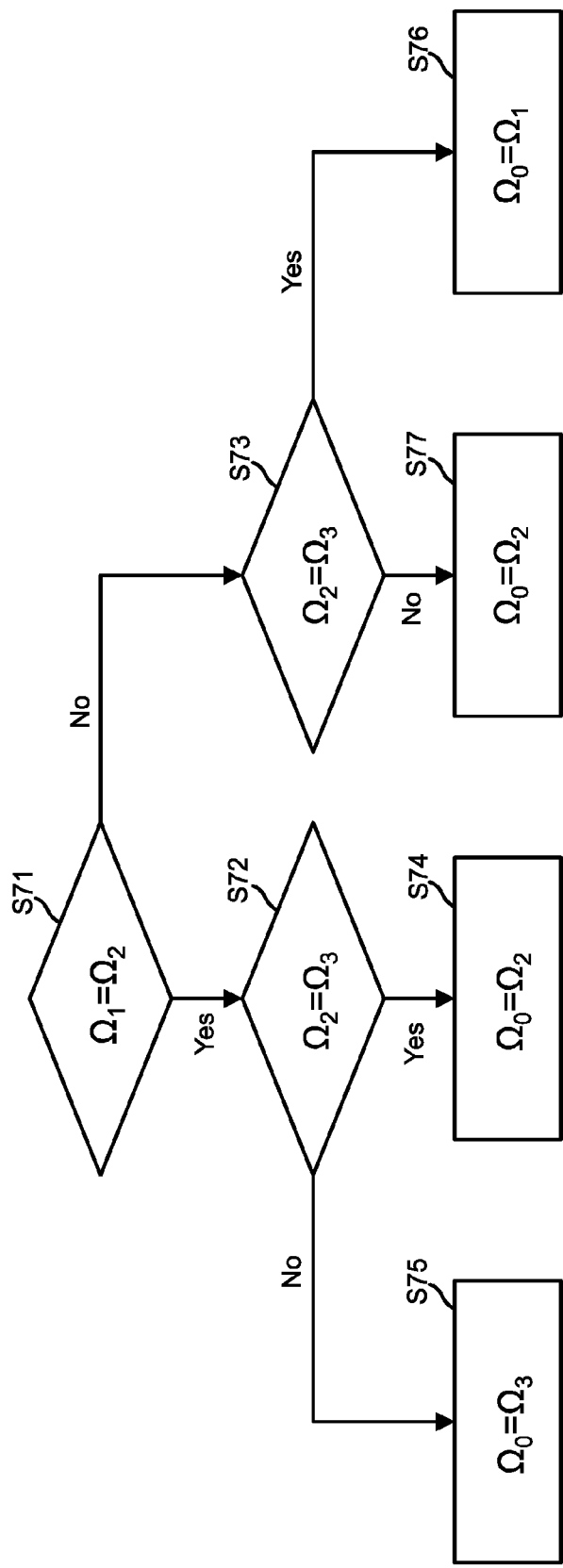
FIG. 7 is a determination process adopted by a comparing circuit of the present invention.

In one embodiment, the comparing circuit 38 may be realized through executing an instruction stored in a memory by a processor. FIG. 7 shows a determination process adopted by the comparing circuit 38 according to an embodiment of the present invention. In step S71, it is determined whether the peak frequencies $\Omega_1$ and $\Omega_2$ are the same. When it is determined that the peak frequencies $\Omega_1$ and $\Omega_2$ are the same, it is determined whether the peak frequencies $\Omega_2$ and $\Omega_3$ are the same in step S72. When it is determined that the peak frequencies $\Omega_2$ and $\Omega_3$ are the same in step S72, it means that the peak frequencies $\Omega_1$, $\Omega_2$ and $\Omega_3$ are all the same, which indicates that the input signal y(t) is not interfered by an echo signal. Thus, in step S74, one of the peak frequencies $\Omega_1$, $\Omega_2$ and $\Omega_3$ is outputted as the optimal peak frequency $\Omega_0$. Taking FIG. 7 for instance, the peak frequency $\Omega_2$ is outputted as the optimal peak frequency $\Omega_0$ in step S74. When it is determined that the peak frequencies $\Omega_2$ and $\Omega_3$ are not the same in step S72, it means that the peak frequency $\Omega_3$ is different from the other two peak frequencies $\Omega_1$ and $\Omega_2$, and the peak frequency $\Omega_3$ is outputted as the optimal peak frequency $\Omega_0$ in step S75.

When it is determined that the peak frequencies $\Omega_1$ and $\Omega_2$ are different in step S71, it is determined whether the peak frequencies $\Omega_2$ and $\Omega_3$ are the same in step S73. When it is determined that the peak frequencies $\Omega_2$ and $\Omega_3$ are the same in step S73, it means that the peak frequency $\Omega_1$ is different from the other two peak frequencies $\Omega_2$ and $\Omega_3$, and so the peak frequency $\Omega_1$ is outputted as the optimal frequency $\Omega_0$. When it is determined that the peak frequencies $\Omega_2$ and $\Omega_3$ are different in step S73, it means that the peak frequencies $\Omega_1$, $\Omega_2$ and $\Omega_3$ are all different, which means that the input signal y(t) is severely interfered by noise. Thus, in step S77, one of the peak frequencies $\Omega_1$, $\Omega_2$ and $\Omega_3$ may be outputted as the optimal peak frequency $\Omega_0$. Taking FIG. 6 for instance, the peak frequency $\Omega_2$ is outputted as the optimal peak frequency $\Omega_0$ in step S77. In another embodiment, in step S77, the transmitter may be requested to again transmit the input signal y(t).

One person skilled in the art can understand that, the order of the determination steps or combinations of the determination logics may be equivalent exchanged, and such modifications do not affect the overall effect of the determination process.

It should be noted that, in other embodiments of the present invention, the CFO estimating apparatus 300 may include four, five or even more notch filters.

It should be noted that, in other embodiments of the present invention, the $4^{th}$ power circuit 31 may be replaced by an $M^{th}$ power circuit, where M is a positive integer greater than 1 and is associated with a modulation scheme performed on the input signal y(t). For example, when the modulation scheme of the input signal y(t) is QPSK, the integer M may be equal to an integral multiple of 4, e.g., 4 or 8. Similarly, when the modulation scheme of the input signal y(t) is 8 phase shift keying (8PSK), the integer M may be an integral multiple of 8, e.g., 8 or 16. However, corresponding to the $M^{th}$ power circuit, the peak frequency $\Omega$ determined by the peak frequency determining circuit 33 corresponds to an M-fold CFO $\Delta f$, and so the frequency offset determining circuit 34 may generate the estimated CFO $\Delta f_E$ according to the value M. For example, when M=8, the frequency offset determining circuit 34 may divide the peak frequency $\Omega$ identified by the peak frequency determining circuit 33 by 8 to generate an estimated CFO $\Delta f_E$.

In practice, the peak frequency determining circuit 33, the frequency offset determining circuit 34 and the comparing circuit 38 may be realized by fixed and programmable logic circuits, e.g., programmable logic gate arrays, application-specific integrated circuits, microcontrollers, microprocessors and digital signal processors (DSP). Further, the peak frequency determining circuit 33, the frequency offset determining circuit 34 and the comparing circuit 38 may also be realized through executing an instruction stored in a memory by a processor.

Figure 8:
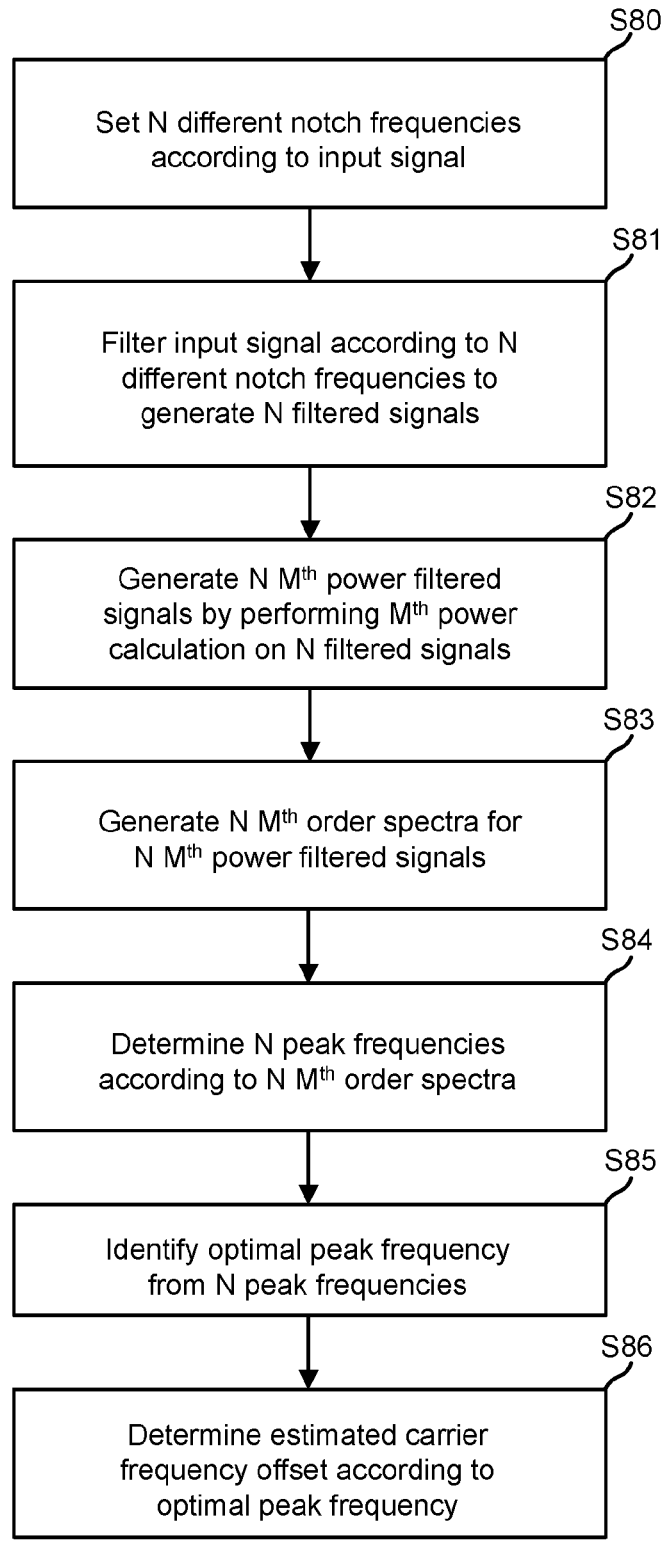
FIG. 8 is a flowchart of a method for estimating carrier frequency offset according to an embodiment of the present invention.

FIG. 8 shows a flowchart of a method for estimating CFO according to an embodiment of the present invention. In step S80, N different notch frequencies are set according to an input signal, where N is an integer greater than 2. In step S81, the input signal is filtered according to the N different notch frequencies to generate N filtered signals. In step S82, an $M^{th}$ power calculation is performed on the N filtered signals to generate N $M^{th}$ power filtered signals, where M is an integer greater than 1 and is associated with a modulation scheme of the input signal. In step S83, N $M^{th}$ order spectra are generated according to the N $M^{th}$ power filtered signals. In step S84, N peak frequencies are determined according to the N $M^{th}$ order spectra. In step S85, an optimal peak frequency is identified from the N peak frequencies. In step S86, an estimated CFO is determined according to the optimal peak frequency.

One person skilled in the art can understand that, operation variations in the description associated with the CFO estimating apparatus 300 are applicable to the CFO estimating in FIG. 7, and such details are omitted herein.

While the invention has been described by way of example and in terms of the embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for estimating carrier frequency offset, comprising:

N notch filters, having different notch frequencies, generating N filtered signals by filtering an input signal, where N is an integer greater than 2;

a notch frequency setting circuit, coupled to the N notch filters, setting the notch frequencies of the N notch filters according to the input signal;

an $M^{th}$ power circuit, coupled to the N notch filters, generating N $M^{th}$ power filtered signals by performing an $M^{th}$ power calculation on the N filtered signals, where M is an integer greater than 1 and is associated with a modulation scheme of the input signal;

a spectrum generating circuit, coupled to the $M^{th}$ power circuit, generating N $M^{th}$ order spectra according to the N $M^{th}$ power filtered signals;

a peak frequency determining circuit, coupled to the spectrum generating circuit, determining N peak frequencies according to the N $M^{th}$ order spectra;

a comparing circuit, coupled to the peak frequency determining circuit, identifying an optimal peak frequency from the N peak frequencies, wherein the optimal peak frequency is a peak frequency that is different from the other peak frequencies among the N peak frequencies; and a frequency offset determining circuit, coupled to the comparing circuit, determining an estimated carrier frequency offset according to the optimal peak frequency.

2. The apparatus according to claim 1, wherein the notch frequency setting circuit comprises:

a center frequency determining circuit, determining a center frequency of the input signal according to the input signal;

a roll-off factor determining circuit, determining a roll-off factor according to the input signal; and a notch frequency calculating circuit, coupled to the center frequency determining circuit and the roll-off factor determining circuit, calculating the notch frequencies of the N notch filters according to the center frequency and the roll-off factor.

3. The apparatus according to claim 2, wherein:

the N notch filters comprise a first notch filter, a second notch filter and a third notch filter;

the notch frequency calculating circuit calculates a side frequency according to the roll-off factor; and the notch frequency calculating circuit sets the notch frequency of the first notch filter to be equal to the center frequency, sets the notch frequency of the second notch filter to be equal to the center frequency added by the side frequency, and sets the notch frequency of the third notch filter to be equal to the center frequency subtracted by the side frequency.

4. The apparatus according to claim 3, wherein the side frequency is equal to $(1-a)/2T$, where a represents the roll-off factor, and T represents a symbol duration of the input signal.

5. The apparatus according to claim 3, wherein the filtered signal generated by the first notch filter corresponds to a first peak frequency, the filtered signal generated by the second notch filter corresponds to a second peak frequency, and the filtered signal generated by the third notch filter corresponds to a third peak frequency; the comparing circuit identifying the optimal peak frequency from the three peak frequencies comprises:

determining whether the first peak frequency and the second peak frequency are the same to generate a first determination result;

determining whether the second peak frequency and the third peak frequency are the same to generate a second determination result; and determining the optimal peak frequency according to the first determination result and the second determination result.

6. A method for estimating carrier frequency offset, comprising:

a) setting N different notch frequencies according to an input signal;

b) filtering the input signal according to the N different notch frequencies to generate N filtered signals, where N is an integer greater than 2;

c) performing an $M^{th}$ power calculation on the N filtered signals to generate N $M^{th}$ power filtered signals, where M is an integer greater than 1 and is associated with a modulation scheme of the input signal;

d) generating N $M^{th}$ order spectra according to the N $M^{th}$ power filtered signals;

e) determining N peak frequencies according to the N $M^{th}$ order spectra;

f) identifying an optimal peak frequency from the N peak frequencies, wherein the optimal peak frequency is a peak frequency that is different from the other peak frequencies among the N peak frequencies; and g) determining an estimated carrier frequency offset according to the optimal peak frequency.

7. The method according to claim 6, wherein step (a) comprises:

determining a center frequency and a roll-off factor of the input signal according to the input signal; and setting the N notch frequencies according to the center frequency and the roll-off factor.

8. The method according to claim 7, wherein the step of setting the N notch frequencies according to the center frequency and the roll-off factor comprises:

determining a side frequency according to the roll-off factor;

setting a first notch frequency to be equal to the center frequency;

setting a second notch frequency to be equal to the center frequency added by the side frequency; and setting a third notch frequency to be equal to the center frequency subtracted by the side frequency.

9. The method according to claim 8, wherein the step of determining the side frequency according to the roll-off factor comprises:

setting the side frequency to be equal to $(1-a)/2T$, where a represents the roll-off factor, and T represents a symbol duration of the input signal.

10. The method according to claim 8, wherein the first notch frequency corresponds to a first peak frequency among the N peak frequencies, the second notch frequency corresponds to a second peak frequency among the N peak frequencies, and the third notch frequency corresponds to a third peak frequency among the N notch frequencies; the step of identifying the optimal peak frequency from the N peak frequencies comprises:

determining whether the first peak frequency and the second peak frequency are the same to generate a first determination result;

determining whether the second peak frequency and the third peak frequency are the same to generate a second determination result; and determining the optimal peak frequency according to the first determination result and the second determination result.

* * * * *